Dec. 1, 1931.  C. F. WASSERFALLEN  1,834,482
SPARE TIRE CARRIER FOR VEHICLES
Filed April 16, 1928  2 Sheets-Sheet 1
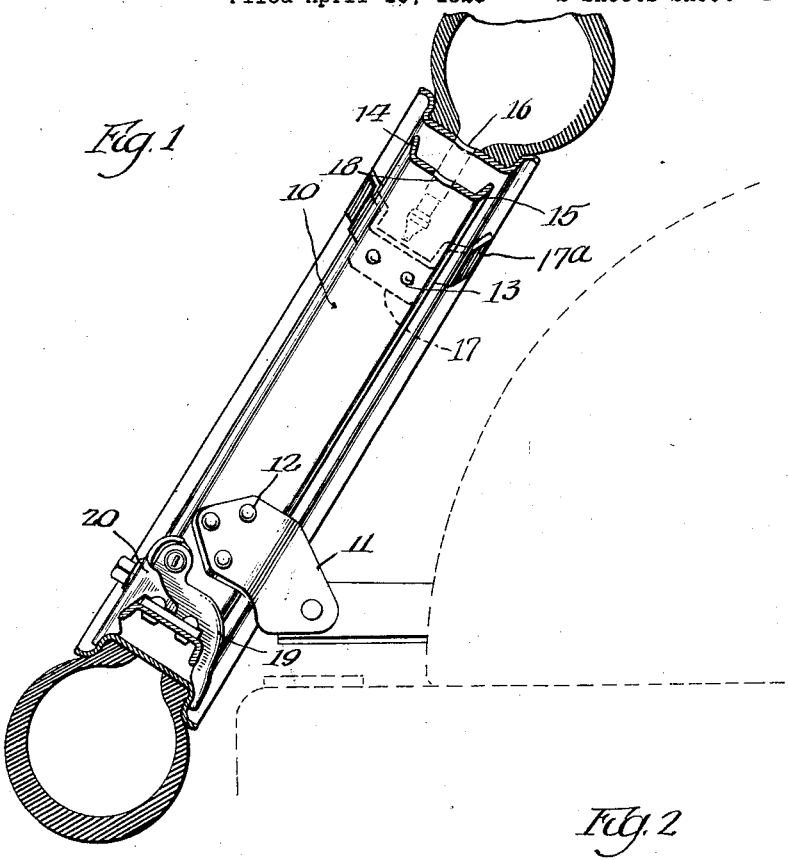
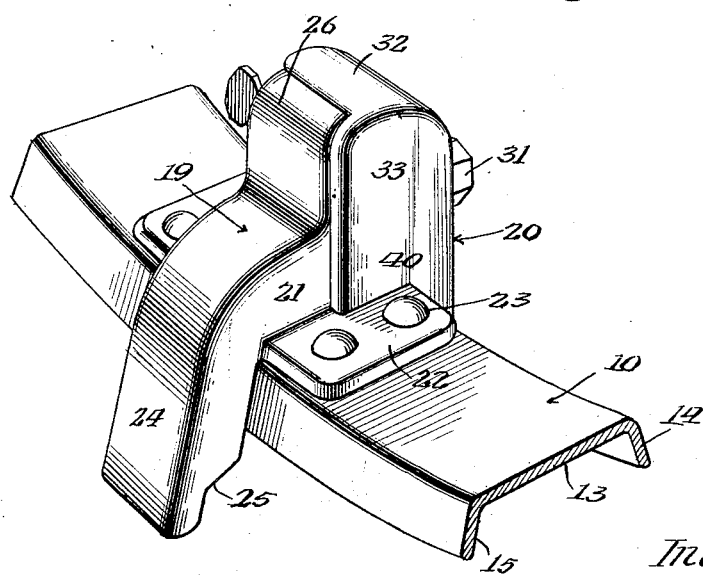

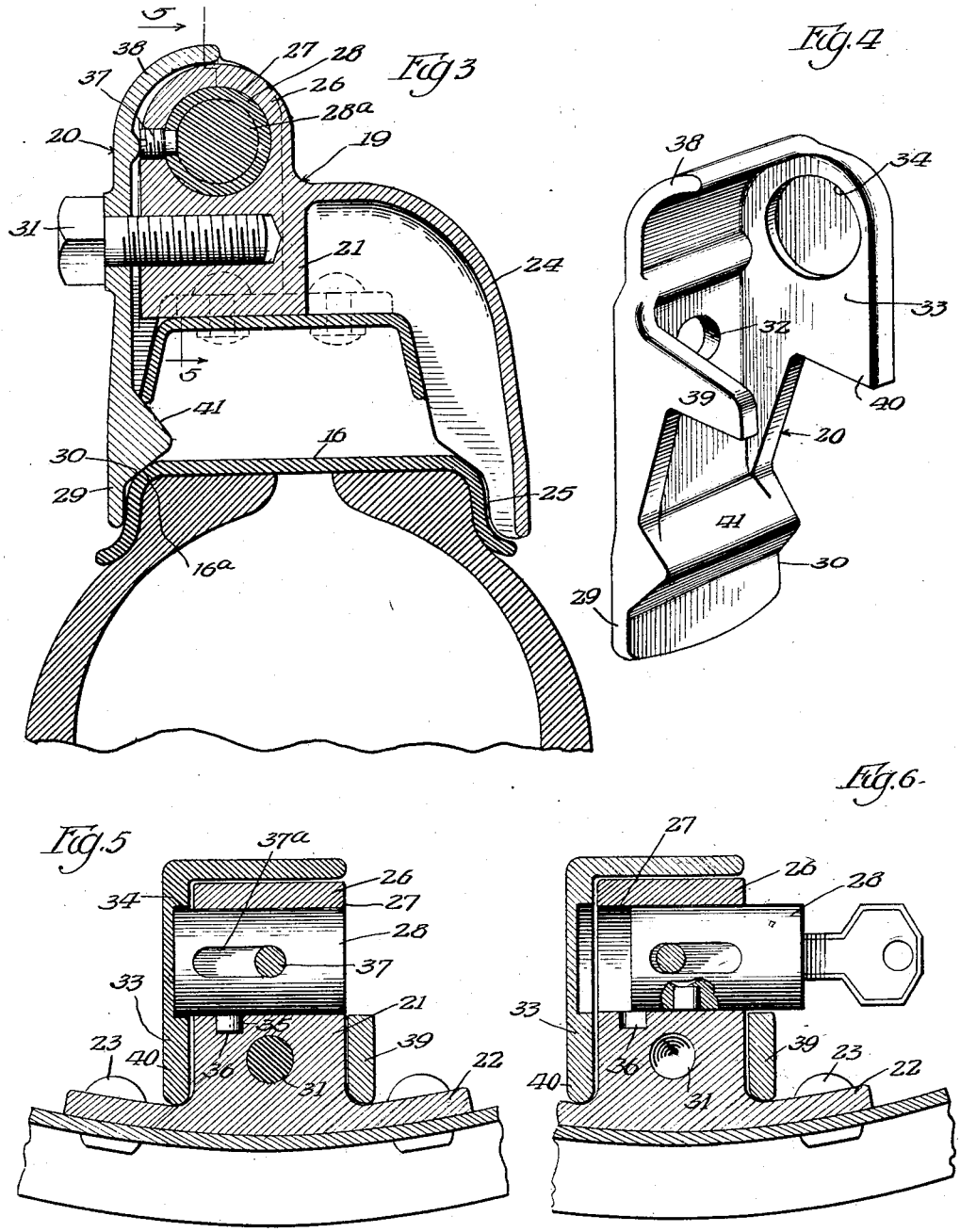

Patented Dec. 1, 1931

1,834,482

UNITED STATES PATENT OFFICE

CHARLES F. WASSERFALLEN, OF DETROIT, MICHIGAN, ASSIGNOR, BY MESNE ASSIGNMENTS, TO DETROIT AND SECURITY TRUST COMPANY, OF DETROIT, MICHIGAN, A CORPORATION OF MICHIGAN

SPARE TIRE CARRIER FOR VEHICLES

Application filed April 16, 1928.  Serial No. 270,459.

The invention relates generally to spare tire carriers for vehicles. More particularly the invention relates to that type of spare tire carrier which comprises a flanged ring and a plurality of supporting brackets which are secured to the ring and are formed to receive and hold in place the demountable rim upon which the spare tire is mounted.

The primary object of the present invention is to provide a carrier of this type having a locking device for preventing the unauthorized removal of the tire which operates as one of the rim-supporting brackets and comprises a removable lock-controlled clamping member which is jammed or forced into engagement with one side of the demountable rim by means of a bolt and embodies lugs which are operative to prevent effectively the element from being pried or swung away from the rim when the bolt is withdrawn.

Another object of the invention is to provide a carrier of the aforementioned character in which provision is made for preventing removal of the locking device from the ring when the rivets or bolts for securing in place the fixed or stationary clamping member are sheared or broken.

A further object of the invention is to provide a locking device for a spare tire carrier which is of new and improved construction, may be manufactured at a comparatively low and reasonable cost and is efficient in operation.

Other objects will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 1 is a vertical section of a spare tire carrier embodying the invention.

Figure 2 is a perspective of the improved locking device for holding and securing in place the demountable rim upon which the spare tire is mounted.

Figure 3 is a transverse sectional view.

Figure 4 is a perspective of the removable clamping member of the locking device.

Figure 5 is a section taken on line 5—5 of Figure 3, showing the locking cylinder in its operative position.

Figure 6 is a sectional view similar to Figure 5, showing the cylinder in its unlocked position.

The invention is exemplified in a spare tire carrier comprising a ring 10 which is adapted to be secured to the chassis of a vehicle by a pair of side brackets 11. These brackets are riveted as at 12 to the base 13 of the ring and the latter is provided at the front and rear sides thereof with radial flanges 14 and 15 which project outwardly and operate to prevent the ring from buckling or being distorted. The demountable rim 16 of the spare tire is supported by means of a pair of brackets or bearing members 17 which are secured to the outer periphery of the base 13 of the ring. These brackets are positioned at the top portion of the ring and are provided with extensions 17a which project outwardly of the side flanges 14 and 15 and form sockets for receiving and internally gripping the rim. An opening or hole 18 for receiving the valve stem of the spare tire is formed in the base of the ring between the brackets 17. In applying the tire to the carrier the rim is held at an angle and is manipulated so as to bring the valve stem into registry with the opening 18. The rim is then dropped obliquely into engagement with the brackets or supporting members 17 and swung axially to bring the lower portion thereof into alignment with the ring 10.

The lower portion of the demountable rim is held in place against displacement by means of the improved locking device which consists of a stationary element or member 19 and a removable wedge-element 20 between which the tire-retaining flanges 16a of the rim are dapted to be clamped as hereinafter described. The stationary member is made from a single piece of metal and comprises a body member 21 which extends axially with respect to the ring 10 and is provided at the sides thereof with a pair of ears 22. These ears extend at substantially right angles to the body member 21 and are shaped to fit against the inner periphery of the base of the ring. Rivets 23 extend through the ears 22 and the ring-base 13 to secure rigidly the element 19 in place. The front end of the body member is provided with an arm 24 which projects downwardly from the front ends of the ears 22 and extends beyond the side flange 15 of the ring. This arm fits against said side flange and the lower portions of the sides thereof are cut away to form a seat 25 for receiving one of the tire retaining flanges $16^a$ of the demountable rim. The parts of the arm that form the seat 25 operate to hold the rim against radial movement and against axial movement in one direction. The front and upper part of the body member is enlarged to form a substantially semi-cylindrical lug 26. The sides of this lug are flush with the sides of the body member and form continuations thereof. A hole or circular opening 27 extends transversely through the lug 26. A key operable cylinder lock 28 is disposed in this opening and is longitudinally or axially slidable therein so that it may be shifted into locking relation with the wedge-element 20.

The clamping-element 20, like the stationary or fixed element 19, is made from a single piece of metal and comprises an arm 29 which extends beyond the side flange 14 of the carrier-ring. The lower end of this arm is shaped to form a seat 30 for receiving the tire-retaining flange $16^a$ at the rear side of the demountable rim. A bolt 31 extends through a hole 32 in the central part of the element 20 and is threaded to the rear end of the body-member 21. By tightening the bolt 31 pressure is applied to the clamping element. This operates to force together the arms 24 and 29 and clamps the parts which form the seats 25 and 30 around the flanges $16^a$ of the demountable rim. In this manner the rim with the spare tire thereon is securely held in place against either radial or axial displacement. The seat 30 is flared outwardly so that it operates under the pressure of bolt 31 to force by a wedge action the rim 16 into engagement with the supporting brackets 17. Thus the rim is securely held without squeaking or rattling. A characteristic of forming the clamping elements of the locking device with arms of the character set forth is that the device operates as one of the rim supporting brackets and cooperates with the latter to hold the rim in spaced relation with respect to the carrier-ring.

The wedge or removable clamping element 20 is provided at one side thereof with a wing 33 which is adapted to fit against and lap one side of the lug 26 when the element is in its operative position. This wing has a circular opening or socket 34 formed in the face thereof which fits against the cylinder-carrying lug 26. The end of the lock 28 which is remote from the key-slot fits within the socket 34 when the lock is shifted into the position shown in Figure 5. In this position the wedge-element is locked against removal. The lock is held in its operative or locked position by means of a pin 35 which fits into a socket 36. The pin is carried by the lock and is shiftable by rotation of the inner and key bearing cylinder $28^a$ into the socket 36. Reverse rotation of the inner cylinder $28^a$ operates to retract the pin and permits the lock to be shifted away from the wing and out of engagement with the socket 34 (Figure 6). In this position the wedge element 20 is free so that it may be removed when the bolt 31 is withdrawn. To prevent the lock from being removed from the lug 26 when the pin 35 is out of registry with the socket 36, a set screw 37 is provided. This screw is threaded to the rear end of the lug 28 and projects into an elongated slot $37^a$ which is formed in the lock-casing. The upper end of the wedge-element 20 is extended as at 38 and shaped so as to cover and prevent removal of the set screw 37 when the element is in its operative position.

To prevent the unauthorized removal of the spare tire and rim by swinging the wedge element upwardly and around the protruding end of the lock 28 when the bolt 31 is withdrawn, a pair of lugs 39 and 40 are provided. These lugs are formed integrally with the wedge or clamping element and project forwardly therefrom so as to lap and abut against the sides of the body member 21. The bottom edges of the lugs are straight and when the wedge-element is in its operative position they abut against the upper surfaces of the ears 22 and cooperate therewith to prevent said element from being swung upwardly and away from the rim 16. When the bolt is tightened to jam the wedge element 20 into place the lugs 39 and 40 slide upon the ears 22 and serve to guide the element in a substantially rectilinear path. The upper portion of lug 39 is cut diagonally so as to expose the end of the lock 28 having the key-slot and to permit the lock to be shifted longitudinally out of engagement with the socket 34. The upper portion of the lug 40 is formed integrally with the wing 33.

To prevent theft of the spare tire and rim by shearing the rivets 23 and prying the locking device off the ring, the lower end of the clamping element 20 is provided with an enlarged portion 41 which operates as a lug and extends under the side flange 14. Since the demountable rim 16 is securely held against axial movement by the supporting brackets 17 and the elements 19 and 20 are rigidly secured together against co-relative movement by the lugs 39 and 40 when the lock 28 is operative, it is impossible to swing the locking device out of engagement with the ring. It is therefore manifest that even though the rivets 23 are sheared away or broken, the locking device remains in position to prevent removal of the spare tire.

The operation of the carrier will be as follows: When it is desired to secure a spare tire upon the carrier, the lock 28 is first released and then the bolt 31 and the clamping element 20 are withdrawn. The tire and rim are then positioned upon the brackets 17 in the manner hereinbefore described and are swung axially to bring the lower portion of the front tire retaining flange 16ª against the seat 25 at the distal end of the arm 24. Next, the clamping element 20 is slid into its operative position and then the bolt 31 is applied. As the bolt 31 is tightened it forces the element 20 forwardly and jams the seat 30 into engagement with the rear flange 16ª. This forces the rim into engagement with the seat 25 and the supporting brackets 17. To prevent theft or the unauthorized removal of the tire and rim, the lock 28 is shifted until it projects into the socket 34. The key is then rotated. This forces the pin 35 into its retaining socket 36 and prevents axial displacement of the lock. Upon removal of the key the element 20 is effectively held against removal, the lugs 39 and 40 operating to prevent it from being pried or forced upwardly out of engagement with the rim.

The locking device shown and described herein may be readily applied to the ring 16, efficiently accomplishes its purpose, and may be manufactured at a comparatively low and reasonable cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a carrier of the character described, the combination of a ring adapted to be connected to a vehicle and having means for supporting a demountable rim, and means for locking the rim on the supporting means comprising an element fixed to the ring, and extending inwardly therefrom, a second element adapted to engage one side of the rim, means connectable to the fixed element and operable to clamp said second element against the rim, lock controlled means for connecting and locking the elements together, and lug means secured to the second element and projecting so as to lap the inner periphery of the ring when said second element is in its clamped position, said lug means being operative together with the lock controlled means to prevent said second element from being forced out of engagement with the rim when the clamping means is released.

2. In a carrier of the character described, the combination of a ring adapted to be connected to a vehicle and having means for supporting a demountable rim, and means for locking the rim on the supporting means comprising an element fixed to the ring and extending inwardly therefrom, a second element adapted to have one end thereof engage one side of the rim, means connectable to the fixed element and operable to clamp said second element against the rim, lock controlled means for connecting and locking the other end of the second element to the fixed element, and a lug secured to the central portion of the second element and projecting so as to lap the inner periphery of the ring when said second element is in its clamped position, said lug being operative together with the lock controlled means to prevent said second element from being forced out of engagement with the rim when the clamping means is released.

3. In a carrier of the character described, the combination of a ring adapted to be connected to a vehicle and having means for supporting a demountable rim, and means for locking the rim on the supporting means comprising an element fixed to the ring and extending inwardly therefrom, a second element adapted to engage one side of the rim, a bolt connected to said fixed element and operable to clamp said second element against the rim, lock controlled means for connecting and locking the elements together, a lug formed integrally with the second element and projecting so as to lap the inner periphery of the ring when said second element is in its clamped position, said lug being operative together with the lock-controlled means to prevent said second element from being forced out of engagement with the rim when the bolt is sheared or withdrawn.

4. A device for locking a rim in place on a carrier, comprising an element having means whereby it may be fixedly secured to said carrier, a second element embodying means for engaging the rim, means for clamping the two elements together, a member secured to the second element and extending so as to lap a portion of the fixed element when said second element is in its clamped position, said member having a socket formed therein, and lock controlled means carried by said fixed element and shiftable into the socket to lock the two elements together.

5. A device for locking a rim in place on a carrier, comprising an element provided with means whereby it may be fixedly secured to said carrier and having an opening extending transversely therethrough, a second element embodying means for engaging the rim, means for clamping the two elements together, a member secured to the second element and extending so as to lap a portion of the fixed element when said second element is in its clamped position, said member having a socket formed therein, and lock controlled means slidably mounted in said opening and shiftable into the socket to lock the two elements together.

6. A device for locking a rim in place on a carrier, comprising an element adapted to be fixedly secured to said carrier and provided with an enlarged portion at one end thereof, said portion having a transverse opening extending therethrough, a second element embodying means for engaging the rim, means for clamping the two elements together, a wing secured to the second element and extending so as to lap one side of the enlarged portion when said second element is in its clamped position, said wing having a socket formed therein, and a cylinder lock slidably mounted in the opening and shiftable into the socket to lock the two elements together.

7. A device for locking a rim in place on a carrier, comprising an element adapted to be fixedly secured to said carrier, a second element embodying means for engaging the demountable rim, means for clamping the two elements together, a member secured to the second element and extending so as to lap a portion of the fixed element when said second element is in its clamped position, said member having a socket formed therein, a cylinder lock slidably mounted in one end of said fixed element and shiftable into the socket to lock the elements together, and a pin extending into the said one end of the fixed element and adapted to limit the sliding movement of the lock, the second element being extended so as to cover the pin when it is in locked relation.

8. A device for locking a rim in place on a carrier, comprising an element having an ear at one side thereof whereby it may be fixedly secured to said carirer, a second element embodying means for engaging the rim, a bolt for clamping the two elements together, means carried by said fixed element for locking the elements together, and a lug secured to said second element and extending so as to fit against the ear when said second element is in its locked position and to maintain the elements in rigid relation.

9. A device for locking a rim in place on a carrier, comprising an element having an ear at one side thereof whereby it may be fixedly secured to said carrier, a second element embodying means for engaging the rim, a bolt for clamping the second element against the fixed element, means carried by said fixed element for locking the elements together, and a lug secured to said second element and extending to fit against one side of the fixed element and abut against the ear when said second element is in its locked position so as to maintain the elements in rigid relation.

10. A device for locking a rim in place on a carrier, comprising an element having a pair of ears at the sides thereof whereby it may be fixedly secured to said carrier, a second element embodying means for engaging the rim, means for clamping the second element against the fixed element, means carried by said fixed element for locking the elements together, and a pair of lugs secured to the sides of said second element and extending so as to fit against the sides of the fixed element and abut against the ears when said second element is in its locked position.

Signed at Chicago, Illinois, this 20th day of March, 1928.

CHARLES F. WASSERFALLEN.